United States Patent
Duval et al.

(10) Patent No.: US 7,836,239 B2
(45) Date of Patent: Nov. 16, 2010

(54) SECURED USB PERIPHERAL

(75) Inventors: Benjamin Duval, Saint Maximin (FR); Alain Pomet, Rousset (FR)

(73) Assignee: STMicroelectronics SA, Montrouge (FR)

( * ) Notice: Subject to any disclaimer, the term of this patent is extended or adjusted under 35 U.S.C. 154(b) by 34 days.

(21) Appl. No.: 11/462,110

(22) Filed: Aug. 3, 2006 (Under 37 CFR 1.47)

(65) Prior Publication Data
US 2007/0106825 A1 May 10, 2007

(30) Foreign Application Priority Data
Aug. 19, 2005 (FR) ................................. 05 08645

(51) Int. Cl.
*G06F 13/00* (2006.01)
*G06F 13/14* (2006.01)

(52) U.S. Cl. ...................................... 710/305; 710/300
(58) Field of Classification Search .................. 710/106
See application file for complete search history.

(56) References Cited

U.S. PATENT DOCUMENTS

| | | | | |
|---|---|---|---|---|
| 6,854,024 B2 * | 2/2005 | Barrenscheen et al. | ........ | 710/19 |
| 6,920,569 B1 * | 7/2005 | Wauters et al. | .............. | 713/300 |
| 6,957,292 B2 * | 10/2005 | Croyle | ........................ | 710/305 |
| 7,082,545 B2 * | 7/2006 | Kubo et al. | .................. | 713/330 |
| 7,177,969 B2 * | 2/2007 | Croyle | ......................... | 710/305 |
| 7,193,442 B2 * | 3/2007 | Zhu | ............................. | 326/82 |
| 7,464,206 B2 * | 12/2008 | Tsunekawa | .................. | 710/105 |
| 2001/0005641 A1 * | 6/2001 | Matsumoto et al. | ............ | 439/1 |
| 2002/0129180 A1 * | 9/2002 | Kitagawa | ..................... | 710/105 |
| 2002/0147876 A1 * | 10/2002 | Croyle | ......................... | 710/305 |
| 2002/0156949 A1 * | 10/2002 | Kubo et al. | ................... | 710/72 |
| 2002/0169915 A1 * | 11/2002 | Wu | ............................. | 710/305 |
| 2004/0133820 A1 * | 7/2004 | Tanabe et al. | ............... | 713/600 |
| 2005/0138239 A1 * | 6/2005 | Kasahara | ..................... | 710/33 |
| 2005/0228934 A1 * | 10/2005 | Tsutsui | ....................... | 710/313 |
| 2005/0246472 A1 * | 11/2005 | Croyle | ......................... | 710/305 |
| 2006/0015670 A1 * | 1/2006 | Cinkler et al. | .............. | 710/302 |
| 2006/0075152 A1 * | 4/2006 | Zhu | ............................. | 710/15 |
| 2006/0076977 A1 * | 4/2006 | Zhu | ............................. | 326/86 |
| 2008/0215765 A1 * | 9/2008 | Butler et al. | .................. | 710/15 |

OTHER PUBLICATIONS

*Universal Serial Bus Specification Revision 2.0*, Apr. 27, 2000, Chapter 7, "Electrical," pp. 119-194. XP-002348936.

* cited by examiner

*Primary Examiner*—Ryan M Stiglic
(74) *Attorney, Agent, or Firm*—Lisa K. Jorgenson; E. Russell Tarleton; Seed IP Law Group PLLC

(57) ABSTRACT

A device includes a serial port for connecting as a slave to a master device through a serial link. The device further includes a detection circuit for detecting the presence of an impedance of the master device, linked to a terminal of the serial port. The device can be used with microprocessor cards comprising a USB port.

26 Claims, 2 Drawing Sheets

SECURED USB PERIPHERAL

BACKGROUND OF THE INVENTION

1. Field of the Invention

The present invention relates to peripherals comprising a serial port for connecting to a master device, like a computer or a hub, via a serial link.

2. Description of the Related Art

The present invention more particularly relates to peripherals comprising a serial port of the USB type (Universal Serial Bus), for connecting to a master device.

A serial port of the USB type comprises four connection terminals, that is two differential data transmission terminals, and two positive and negative power supply terminals able to supply continuous current to the peripheral.

Usually, a master device comprises means for detecting the connection and disconnection of a peripheral device of the USB type. This detection function does not exist on the side of a peripheral of the USB type. However, a peripheral can be connected to a master device with one and/or the other transmission links faulty, so that the peripheral is powered by the USB link but cannot communicate with the master device. If it is a secured device, like microprocessor cards memorizing secret information, fraudsters can try to discover these secret information by powering on the card and taking measures on the data transmission terminals.

It is therefore desirable to be able to adapt the operating mode of the peripheral depending on whether it is connected to a master device, and particularly to determine whether the peripheral can securely communicate through the serial link.

The detection by a peripheral of a master device connected to the peripheral via a USB link sometimes raises several issues.

First, the USB standard 2.0 provides three data transmission speeds, that is a Low Speed of 1.2 Mb/s, a Full Speed of 12 Mb/s and a High Speed of 480 Mb/s. The master device must be able to detect the transmission speed used by the peripheral. However, according to the USB standard, the selection of one of these transmission speeds is performed by the master device according to some features of the serial port of the peripheral. In particular, a peripheral of the USB type comprises a pull-up resistor connectable to one or the other data transmission terminal of the USB port, according to the transmission speed compatible with the peripheral. This speed is determined by the master device by detecting whether one or the other positive or negative data transmission terminal is connected to this resistor. If this resistor is connected to the positive transmission terminal, the USB port of the peripheral operates at full speed. If this resistor is connected to the negative transmission terminal, the USB port of the peripheral operates at low speed. At last, if this resistor is not connected to any transmission terminals, the peripheral operates at high speed.

Next, the USB standard imposes voltage levels on data transmission terminals. Particularly, the voltage must not simultaneously exceed 0.8 Volt on both data transmission terminals.

BRIEF SUMMARY OF THE INVENTION

One embodiment of the present invention overcomes these problems and enables a peripheral to detect the presence of a master device to which it is connected through a serial link.

One embodiment of the invention is a device comprising a serial port for connecting itself as a slave to a master device via a serial link. According to one embodiment of the invention, the device comprises a detection circuit for detecting the presence of an impedance of a master device, linked to a terminal of the serial port.

According to one embodiment, the impedance detected by the detection circuit is a pull-down resistor.

According to one embodiment, the impedance detected by the detection circuit is a resistor with a value comprised within a range of values.

According to one embodiment, the detection circuit comprises a bias stage for generating a measure voltage on the terminal of the serial port, and a detection stage comprising at least one comparator for comparing the measure voltage to a reference voltage.

According to one embodiment, the detection stage comprises two comparators for comparing the measure voltage to a high reference voltage and a low reference voltage, and means for generating a detection signal indicating whether the measure voltage is comprised between the high and low reference voltages.

According to one embodiment, the detection circuit comprises a first detection stage of a first pull-down resistor of a master device, linked to a first terminal of the serial port, and a second detection stage of a second pull-down resistor of the master device, linked to a second terminal of the serial port.

According to one embodiment, the detection circuit comprises a bias stage for generating a first measure voltage on the first terminal of the serial port, and a second measure voltage on the second terminal of the serial port, each detection stage comprising at least one comparator for comparing the measure voltage to a reference voltage.

According to one embodiment, each measure voltage is lower than 0.8 Volt, even if there is not any pull-down resistors of a master device connected to the terminals of the serial port.

According to one embodiment, the detection circuit comprises means for generating a detection signal indicating whether the two detection stages detect the presence of a pull-down resistor with a value comprised within a range of values.

According to one embodiment, each detection stage comprises two comparators for comparing the measure voltage to a high reference voltage and a low reference voltage, and means for generating a detection signal indicating whether the measure voltage is comprised between the high and low reference voltages.

According to one embodiment, the first and second terminals of the serial port are dedicated to data transmission in differential form.

According to one embodiment, the detection circuit is powered through third and fourth terminals of the serial port.

According to one embodiment, the detection circuit is deactivated after detecting a master device, and before establishing a communication through the serial link.

According to one embodiment, the serial port is of the Universal Serial Bus type.

According to one embodiment, the device is an integrated circuit.

According to another embodiment, a method for establishing data communication between a master device coupled to a slave device via a serial link, where the slave device has a serial port and the serial port has data terminals, includes determining whether an impedance of the master device is between a low impedance value and a high impedance value, and establishing data communication if the impedance of the master device is between the low impedance and high impedance values.

According to a further embodiment of the invention, a system for establishing data communication over a serial link connecting a master device and a slave device, where the master device has a means for detecting data transmission speed and the slave device has a serial port having a data terminal, includes a means for disabling the data transmission speed detection means, a means for determining whether an impedance of the master device is between a low impedance value and a high impedance value, a means for enabling the data transmission speed detection means if the impedance is between the low impedance value and the high impedance value, and a means for establishing data communication over the serial link if the impedance is between the low and high impedance values.

BRIEF DESCRIPTION OF THE SEVERAL VIEWS OF THE DRAWING(S)

These and other advantages and features of the present invention will be presented in greater detail in the following description of the invention in relation to, but not limited by the following figures.

DETAILED DESCRIPTION OF THE INVENTION

Figure 1:
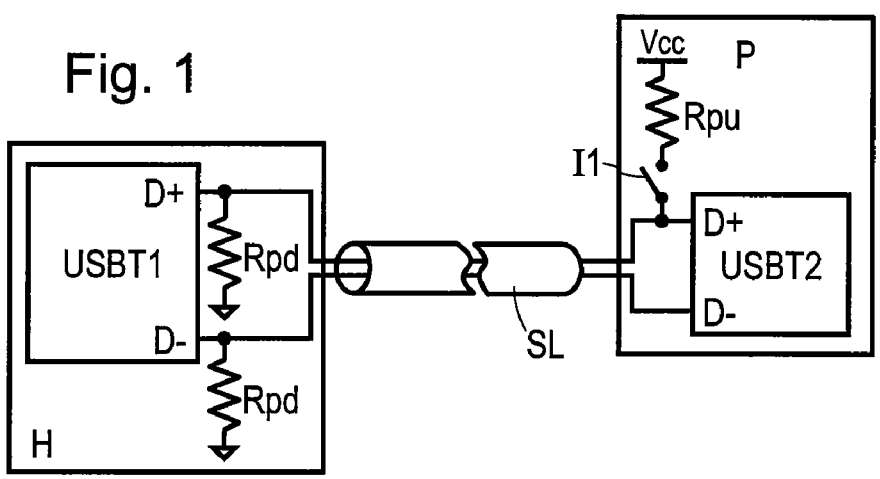
FIG. 1 shows, in block form, a master device connected to a peripheral through a USB linked at full speed, according to an embodiment of the invention.
Figure 2:
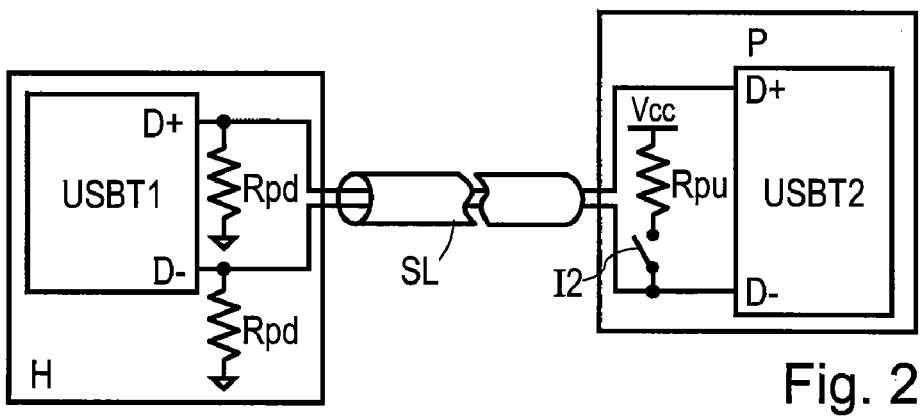
FIG. 2 shows, in block form, a master device connected to a peripheral through a USB link at low speed, according to an embodiment of the invention.

FIGS. 1 and 2 show a master device H constituted by a computer or a hub, connected through a serial link SL of the USB type to a slave device or peripheral P. The master device H comprises an interface circuit USBT1 connected to a serial port comprising two positive and negative data transmission terminals D+, D−. Each terminal D+ and D− is connected to a line of differential data transmission of the serial link SL. The master device comprises two pull-down resistors Rpd. Each resistor respectively links a data terminal D+, D− of the serial port to the ground.

The peripheral P also comprises an interface circuit USBT2 connected to a serial port comprising two terminals D+, D− connected to the data transmission lines of the serial link SL.

FIG. 1 illustrates the case where the transmission between the master device H and the peripheral P is performed at full speed. In that case, the positive data transmission terminal D+ of the peripheral P is linked to the supply voltage Vcc supplied by the link USB by means of a pull-up resistor Rpu mounted in series with a switch I1.

FIG. 2 illustrates the case where the link USB SL between the master device H and the peripheral P is at low speed. In that case, the pull-up resistor Rpu connected to the power supply Vcc is linked to the negative data transmission terminal D− via a switch I2.

Figure 3:
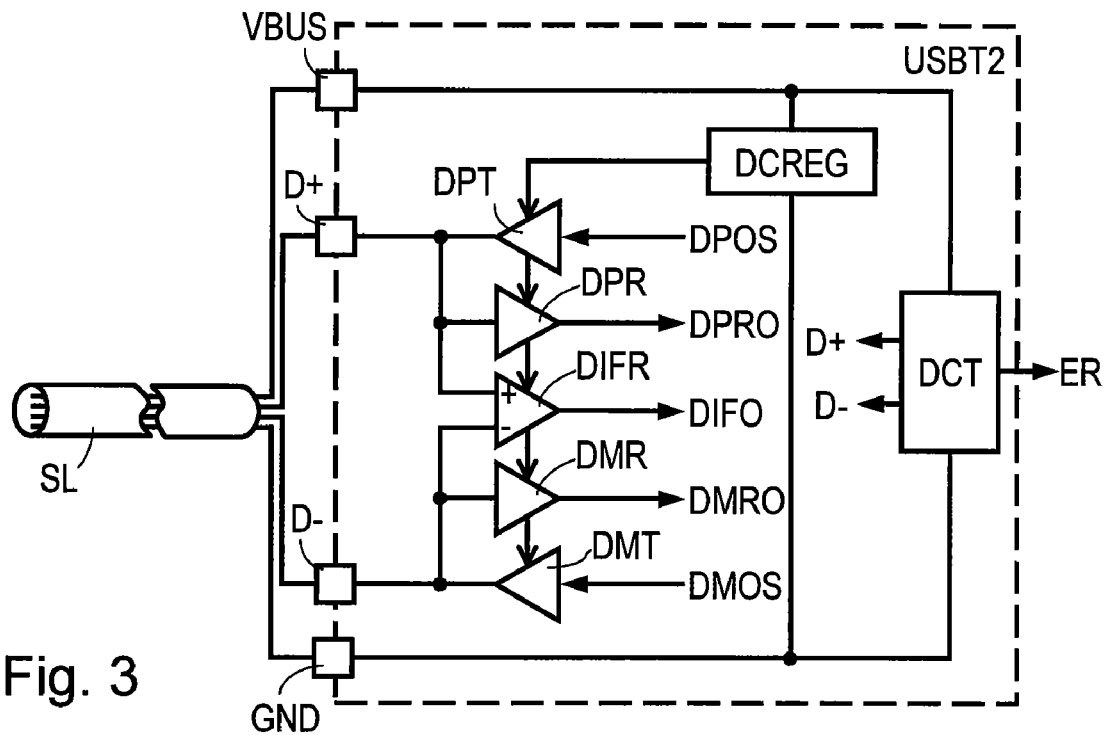
FIG. 3 shows, in block form, an interface circuit of a USB port of a peripheral equipped with a master device detection circuit according to an embodiment of the invention.

FIG. 3 shows the interface circuit USBT2 of the peripheral P. FIG. 3 shows the four connection terminals of the USB serial port of the peripheral. These four terminals comprise two positive and negative continuous power supply terminals VBUS, GND at about 3.3 Volts, and the two differential data transmission terminals D+, D− described hereinbefore and shown in FIGS. 1 and 2. The circuit USBT2 comprises send buffer memories DPT, DMT, single-ended receivers DPR, DMR, and a differential receiver DIFR. The positive data transmission terminal D+ is connected to the output of the send buffer memory DPT, to the input of the receiver DPR, and to a positive input of the differential receiver DIFR. The negative data transmission terminal D− is connected to the output of the send buffer memory DMT, to the input of the receiver DMR, and to a negative input of the differential receiver DIFR. The power supply terminals VBUS and GND power a DC voltage regulator DCREG. The regulator DCREG supplies a supply voltage of 3 Volts to the receivers DPR, DIFR, DMR and to the send buffer memories DPT, DMT. The receivers DPR, DIFR, DMR respectively supply data signals DPRO, DIFO and DMRO carrying the data transmitted by the link SL. The send buffer memories DPT, DMT receive from the peripheral P data signals DPOS, DMOS to be emitted on the link SL.

The interface circuit USBT2 comprises a detection circuit DCT enabling the peripheral P to detect whether it is connected to a master device H through a link of the USB type.

Figure 4:
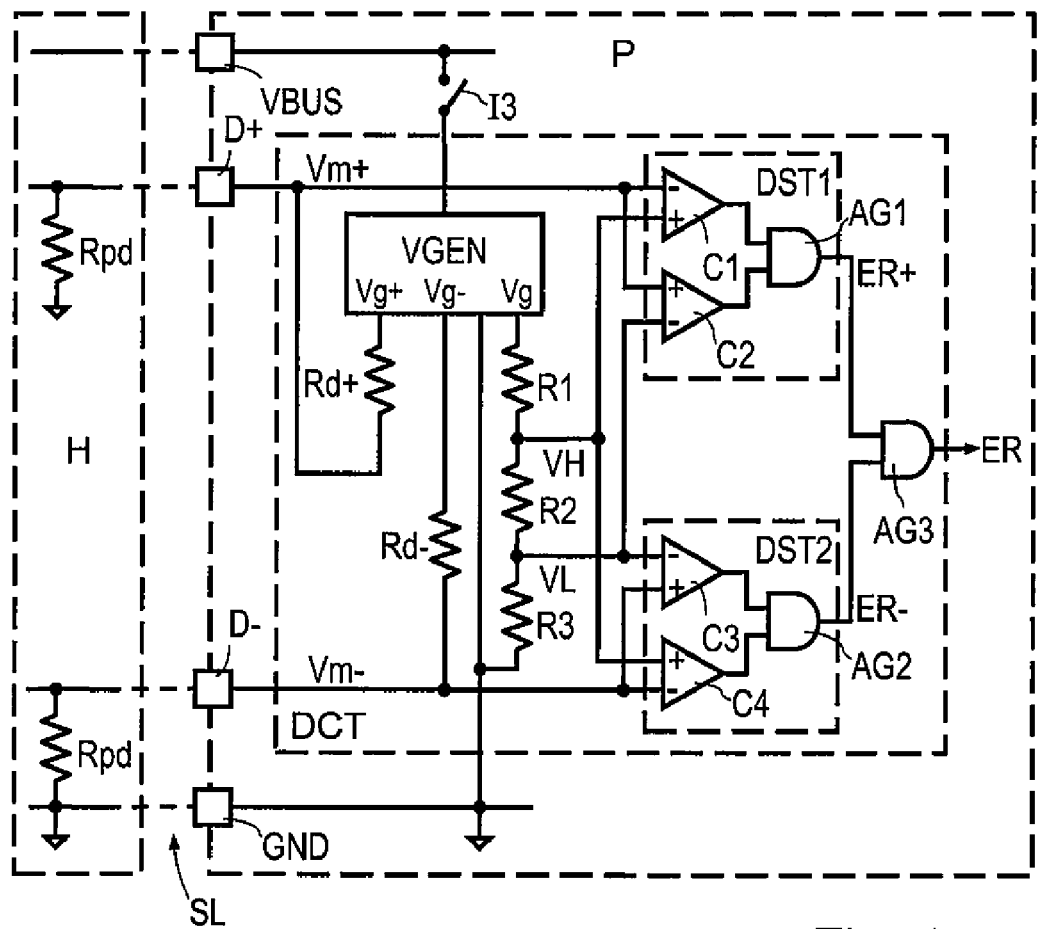
FIG. 4 shows an embodiment of a detection circuit according to the invention.

FIG. 4 shows an embodiment of the detection circuit DCT shown in FIG. 3. The detection circuit DCT comprises a DC voltage generator VGEN, powered by the power supply terminals VBUS, GND of the USB port. The voltage generator VGEN supplies a continuous voltage Vg+, through a resistor Rd+, to the positive data terminal D+ of the USB port of the peripheral. Likewise, the voltage generator VGEN supplies a continuous voltage Vg−, through a resistor Rd−, to the negative data terminal D− of the USB port.

The voltage generator VGEN thus applies to the positive and negative data terminals measure voltages Vm+ and Vm− with resistors Rpd possibly connected by a serial link SL to the terminals D+ and D−.

The voltage generator VGEN also applies a continuous voltage Vg to a group of three resistors R1, R2, R3 mounted in series, the resistor R1 being connected to the generator VGEN, and the resistor R3 being connected to the ground, that is the ground terminal GND of the USB port of the peripheral P. The resistors R1 and R2 form a first divider bridge supplying a high reference voltage VH in their junction node. In the same way, the resistors R2 and R3 form a second divider bridge supplying a low reference voltage VL in their junction node.

The detection circuit DCT also comprises two detection stages DST1, DST2, each comprising two comparators C1, C2, C3, C4 which outputs are connected to the inputs of an AND gate AG1, AG2. The outputs ER+, ER− of the gates AG1, AG2 are connected to the inputs of another AND gate AG3 which output supplies a signal of detection ER of a master device.

The terminal D+ is connected to the negative input of the comparator C1 and to the positive input of the comparator C2. In addition, the high reference voltage VH is applied to the positive input of the comparator C1, and the low reference voltage VL is applied to the negative input of the comparator C2. That way, the output of the gate AG1 is pulled up if the value of the measure voltage Vm+ applied to the terminal D+ is comprised between the low VL and high VH reference voltages, and otherwise pulled down.

In the same way, the terminal D− is connected to the negative input of the comparator C4 and to the positive input of the comparator C3. The high reference voltage VH is applied to the positive input of the comparator C4, and the low reference voltage VL is applied to the negative input of the comparator C3. The output of the gate AG2 is thus pulled up if the value of the measure voltage Vm− applied to the terminal D− is comprised between the low VL and high VH reference voltages, and otherwise pulled down.

The detection signal ER at the output of the detection circuit is pulled up if the following conditions are simultaneously satisfied:

$$VL < Vm+ < VH \quad (1)$$

$$VL < Vm- < VH \quad (2)$$

and otherwise pulled down.

If pull-down resistors Rpd are connected to the data lines D+, D− of the serial link SL, each forms with the resistor Rd− to which it is connected, a divider bridge to divide the voltage Vg+, Vg−. The data terminal D+, D− connected to the junction node of the resistors Rdp and Rd+ (or Rdp and Rd−) thus supplies a measure voltage Vm+, Vm− depending on the value of the resistor Rpd connected to the data terminal.

If the resistors Rd+, Rd−, R1, R2, R3 are all chosen substantially equal to a predefined resistor R, and if the voltages Vg+, Vg− and Vg supplied by the generator VGEN are substantially equal, the conditions (1) and (2) are equivalent to the following conditions:

$$\tfrac{1}{3} < Rpd/(Rpd+R) < \tfrac{2}{3} \quad (3)$$

or:

$$R/2 < Rpd < 2R \quad (4)$$

If the value of the resistor R is chosen near the one of the pull-down resistors, recommended by the USB standard, that is 15 kOhms, and if pull-down resistors Rpd are present on the USB link connected to the peripheral P, the conditions (4) are satisfied for each data terminal D+ and D−. On the other hand, these conditions are not satisfied if the data terminals D+ and D− are not connected to a USB port of a master device, that is if one and/or the other terminal D+ and/or D− of the peripheral is not connected to a pull-down resistor Rpd, or is in short-circuit with the ground.

The detection circuit DCT which has just been described thus makes it possible to detect the presence of pull-down resistors Rpd of a master device H, connected to the positive D+ and negative D− data terminals of the USB port of the peripheral.

In addition, if the continuous voltages Vg+, Vg− and Vg supplied by the generator VGEN are lower than 0.8 Volts, the detection circuit which has just been described complies with the condition SE1 specified in the USB standard, which imposes that the voltages applied to the terminals D+ and D− must not exceed a voltage Vose1 equal to 0.8 Volt at the same time.

Figure 5:
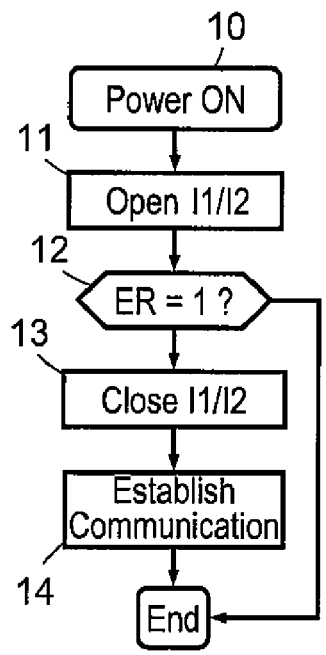
FIG. 5 is a diagram of a startup procedure executed by a peripheral equipped with a detection circuit according to an embodiment of the invention.

FIG. 5 shows a procedure 10 for starting-up the peripheral P according to the invention. At the startup of the peripheral, the peripheral controls the opening of the switch I1 or I2 depending on whether the USB link of the peripheral is at full or low speed, to disconnect the pull-up resistor Rpu (step 11). At the following step 12, the peripheral tests the output signal ER of the detection circuit DCT. If the output signal is pulled up, it means that pull-down resistors Rpd of a master device H are linked by the link SL to the data terminals D+, D− of the peripheral P. In that case, the peripheral closes the switch I1 or I2 (step 13), and tries to establish a communication through its USB port with the master device thus detected (step 14).

If at step 12 the detection signal ER is pulled-down (ER=0), it means that the detection circuit DCT has not detected, on each terminal D+, D−, the presence of a pull-down resistor Rpd having a correct value (conditions (4) not satisfied). The procedure 10 then ends without the peripheral trying to establish a communication through its serial port.

The detection circuit DCT can also comprise a deactivation switch 13 controlled by the peripheral P (FIG. 4). This switch allows the detection circuit to be deactivated when the peripheral is live and has detected the presence of a master device H. The switch 13 is for example interposed on a supply line of the voltage generator VGEN connected to the power supply terminal VBUS of the serial port. The switch 13 is closed at the start-up of the peripheral, and opened before establishing a communication with the master device, after the detection of the latter.

It will be clear to those skilled in the art that the device according to the invention is susceptible of several variations. Thus, the invention does not necessarily apply to a USB link: it more globally applies to any serial link connecting a master device to a slave device. In addition, the impedance detected is not necessarily a pull-down resistor.

The detection of the impedance is not necessarily performed on a data transmission line of the serial link. It can alternately be performed on a supply line of the serial link.

In the case of a differential serial link, it is not necessary to detect the presence of an impedance on each data terminal D+ and D−. Only one of these two terminals can be subjected to the detection performed by the detection circuit. In that case, the voltage generator VGEN generates one measure voltage Vm+ or Vm− only, and the detection circuit DCT comprises one detection stage DST1 or DST2 only.

In addition, it is not necessary to compare the measure voltage Vm+, Vm− to a high reference voltage and a low reference voltage. To simply detect the presence or the lack of a resistor, comparing the measure voltage with a high reference voltage is sufficient. To detect if a terminal of the serial port is linked to the ground, comparing the measure voltage to a low reference voltage is sufficient.

The invention claimed is:

1. A device, comprising:
   a serial port for connecting as a slave to a master device through a serial link; and
   a detection circuit that detects an impedance having a particular value in the master device when the device is connected to the master device, the impedance linked to a terminal of the serial port, the device establishing a data communication with the master device only when the detection circuit detects that at least one measured voltage across the impedance having the particular value is between a low reference voltage that is greater than a ground reference voltage and a high reference voltage that is greater than the low reference voltage.

2. The device according to claim 1, wherein the impedance detected by the detection circuit is a pull-down resistor.

3. The device according to claim 1, wherein the detection circuit utilizes the at least one measured voltage to detect a single resistor in the master device having a value comprised between a low impedance value and a high impedance value that is greater than the low impedance value.

4. The device according to claim 1, wherein the detection circuit comprises:
   a bias stage for generating the at least one measured voltage on the terminal of the serial port, and
   a detection stage including at least one comparator for comparing if the at least one measured voltage is between the high and low reference voltages.

5. The device according to claim 4, wherein the at least one comparator comprises:
two comparators for comparing a first measured voltage and a second measured voltage to the high reference voltage and the low reference voltage, respectively; and
a circuit that generates a detection signal indicating whether the first and second measured voltages are comprised between the high and low reference voltages.

6. The device according to claim 1, wherein the detection circuit comprises:
a first detection stage of a first pull-down resistor of the master device, linked to a first terminal of the serial port; and
a second detection stage of a second pull-down resistor of the master device, linked to a second terminal of the serial port.

7. The device according to claim 6, wherein the detection circuit further comprises a bias stage that generates the first measured voltage on the first terminal of the serial port, and the second measured voltage on the second terminal of the serial port, each detection stage including at least one comparator that compares the first measured voltage or the second measured voltage to the high and low reference voltages.

8. The device according to claim 7, wherein each of the first and second measured voltages is not greater than 0.8 Volt, even if there are not any pull-down resistors of the master device connected to the terminals of the serial port.

9. The device according to claim 6, wherein the detection circuit further comprises a circuit that generates a detection signal indicating whether the first and second detection stages detect the presence of the first and second pull-down resistors with values within a range of values.

10. The device according to claim 7, wherein the first detection stage comprises two comparators configured to compare the first measured voltage to the high reference voltage and the low reference voltage and a first detection circuit that generates a first detection signal indicating whether the first measured voltage is between the high and low reference voltages, and the second detection stage comprises two comparators configured to compare the second measured voltage to the high reference voltage and the low reference voltage and a second detection circuit that generates a second detection signal indicating whether the second measured voltage is between the high and low reference voltages.

11. The device according to claim 6, wherein the first and second terminals of the serial port are dedicated to data transmission in differential form.

12. The device according to claim 6, wherein the detection circuit is powered through third and fourth terminals of the serial port.

13. The device according to claim 1, wherein the detection circuit is deactivated after detecting the impedance of the master device and before establishing the communication through the serial link.

14. The device according to claim 1, wherein the serial port is a Universal Serial Bus port.

15. The device according to claim 1, wherein the serial port and the detection circuit are part of an integrated circuit.

16. A method for establishing data communication between a master device coupled to a slave device via a serial link, the slave device having a serial port and the serial port having data terminals, comprising:
connecting the slave device to the master device and providing current to the slave device from the master device;
determining, at the slave device, whether a first and a second voltage value of a first and second measured voltage respectively across an impedance of the master device having a particular impedance value are between a low reference voltage that is higher than a ground reference voltage and a high reference voltage that is greater than the low reference voltage; and
establishing data communication only when the determining step determines that both the first and second voltage values of the first and second measured voltages of the master device are between the low reference voltage and the high reference voltage.

17. The method of claim 16, further comprising:
disabling data transmission speed defining circuitry of the slave device before determining whether the first and second voltage values of the first and second measured voltages of the impedance of the master device are between the low reference voltage and the high reference voltage; and
enabling the data transmission speed defining circuitry of the slave device in response to determining that the first and second voltage values of the first and second measured voltages of the impedance of the master device are between the low reference voltage and the high reference voltage.

18. The method of claim 17, wherein disabling the data transmission speed defining circuitry further comprises disconnecting pull-up resistors from the data terminals of the serial port.

19. The method of claim 16, wherein determining further comprises:
generating the high reference voltage and the low reference voltage;
generating the first measured voltage at a first data terminal of the serial port based upon the impedance of the master device and generating the second measured voltage at a second data terminal of the serial port; and
comparing first and second voltage values of the first and second measured voltages with the high and low reference voltages to determine whether the impedance of the master device is between a low impedance value and a high impedance value that is higher than the low impedance value.

20. The method of claim 19, wherein establishing data communication further comprises establishing data communication if the impedance of the master device is between the low impedance value and the high impedance value.

21. The method of claim 16, wherein the impedance of the master device is a pull-down resistor.

22. The method of claim 16, wherein the low impedance value is 7.5 ohms and the high impedance value is 30 ohms.

23. A system for establishing data communication over a serial link, comprising:
a master device including a detection circuit that detects a data transmission speed over the serial link; and
a slave device coupled to the master device via the serial link to receive current from the master device, the slave device including
a serial port having a data terminal,
a disabling circuit that disables the data transmission speed detection circuit,
a determining circuit that determines whether first and second voltage values of first and second measured voltages across an impedance of the master device have a value between a low reference voltage that is greater than a ground reference voltage and a high reference voltage that is greater than the low reference voltage, an enabling circuit that enables the data transmission speed detection circuit only when the first and second voltage values of the first and second measured voltages of the detected impedance are between the low reference voltage and the high reference voltage, and a circuit that establishes data communication over the serial link only when the first and second voltage values of the first and second measured voltages are between the low reference voltage and the high reference voltage.

24. The system of claim 23, wherein the determining circuit comprises:

a circuit that generates the high reference voltage and low reference voltage;

a circuit that generates the first and second measured voltages at the data terminal of the serial port based upon the impedance of the master device; and a comparator that compares both the first and second voltage values of the and second measured voltages with the high and low reference voltages to determine whether the impedance of the master device is between the low impedance value and the high impedance value.

25. The system of claim 24, wherein the low impedance value is 7.5 ohms and the high impedance value is 30 ohms.

26. The system of claim 23, wherein the disabling circuit comprises a component that disconnects a pull-up resistor from the data terminal of the serial port.

* * * * *